United States Patent [19]

Pearl

[11] 4,133,236
[45] Jan. 9, 1979

[54] SHARPENABLE CUTTING BLADE WITH SKEW-CUT NOTCHES FOR USE IN SHEET MATERIAL CUTTING APPARATUS

[75] Inventor: David R. Pearl, West Hartford, Conn.

[73] Assignee: Gerber Garment Technology, Inc., South Windsor, Conn.

[21] Appl. No.: 855,797

[22] Filed: Nov. 29, 1977

[51] Int. Cl.² .......................... B26D 1/10; B26D 7/12
[52] U.S. Cl. ........................................ 83/174; 83/852; 83/925 CC
[58] Field of Search ................. 83/852, 835, 854, 853, 83/174, 925 CC

[56] References Cited

U.S. PATENT DOCUMENTS

| 790,072 | 5/1905 | McLean | 83/852 |
| 848,842 | 4/1907 | McKam | 83/852 |
| 2,757,697 | 8/1956 | Simmons et al. | 83/852 X |

Primary Examiner—Frank T. Yost
Attorney, Agent, or Firm—McCormick, Paulding & Huber

[57] ABSTRACT

A sharpenable cutting blade with a series of alternately inclined skew-cut notches along its main cutting edge. Each notch defines a pair of auxiliary cutting edges respectively on opposite sides of the main cutting edge and facing in opposite longitudinal directions. Each auxiliary edge resides in and is half-defined by a main edge defining surface so as to be sharpened simultaneously with the main edge.

20 Claims, 5 Drawing Figures

U.S. Patent  Jan. 9, 1979  4,133,236
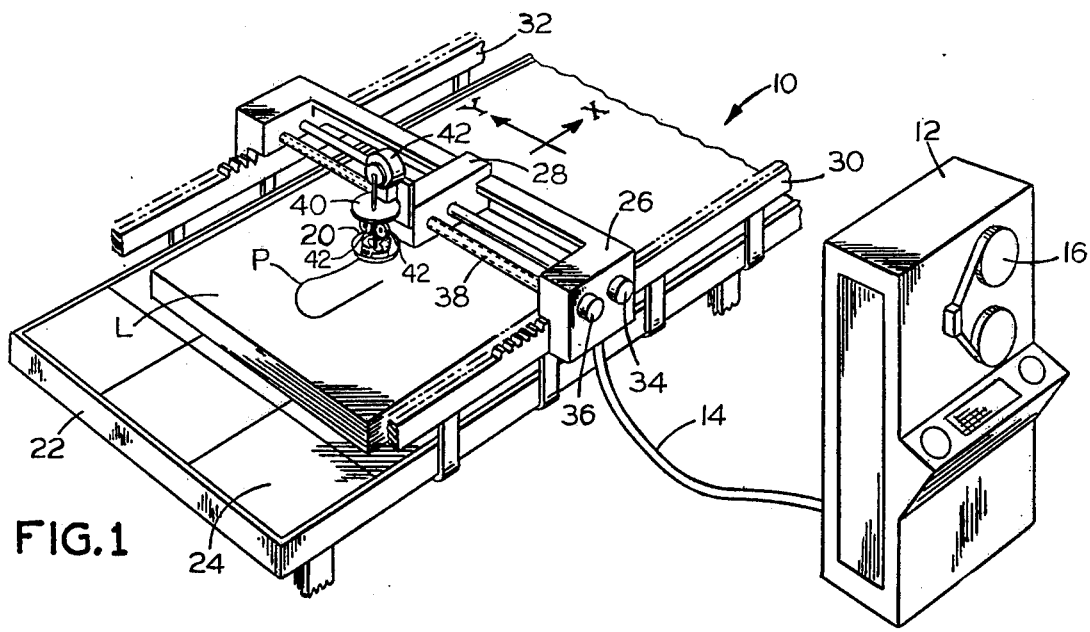

SHARPENABLE CUTTING BLADE WITH SKEW-CUT NOTCHES FOR USE IN SHEET MATERIAL CUTTING APPARATUS

BACKGROUND OF THE INVENTION

The present invention relates to sheet material cutting apparatus of the type used for cutting pattern pieces from single or multi-ply layups of sheet material. More particularly, the invention relates to a sharpenable cutting blade adapted for use in such apparatus.

Sheet material cutting apparatus of the general type mentioned has been in existence for some time. A well-known and commercially accepted apparatus, illustrated and described in U.S. Pat. No. 3,955,458 to Pearl dated May 11, 1976 entitled Cutting Apparatus With Sharpener and Sharpening Method and in other patents to the same assignee, has a reciprocating cutting blade which is suspended in cantilever fashion over a support table on which the sheet material is held in a spread condition during cutting. The cutting blade is of an elongated thin, flat configuration and has a sharp forwardly facing cutting edge defined by and between a pair of acutely angularly related and intersecting surfaces. The blade is reciprocated longitudinally and advanced laterally through the sheet material along predetermined cutting paths at the periphery of pattern pieces. The blade is also adapted for rotation about its own longitudinal axis in order to remain generally tangent to the cutting path in movement therealong. Optionally, the blade may also be adapted for rotation about its longitudinal axis with the axis held in a fixed position for a sheet material drilling operation.

It is also a known practice in sheet material cutting apparatus of the type mentioned to provide for "on-line" sharpening of the cutting blade. That is, in order to minimize apparatus downtime, a blade sharpening device may be included in the apparatus to carry out a sharpening operation without removing the blade from the apparatus. Obviously, removal and replacement of blades and resulting apparatus downtime has significant detrimental effect on production rates.

U.S. Pat. No. 4,033,214 by Pearl, dated July 5, 1977 entitled BLADE SHARPENER to the present assignee illustrates and describes cutting blade sharpening devices incorporated in sheet material cutting apparatus and adapted for "on-line" sharpening. Grinding wheels are employed for sharpening in an automatically operable mechanism which moves the wheels into engagement with the aforementioned longitudinally extending edge defining surfaces on the blade whereby to remove surface material from the surfaces and to sharpen the edge. In the devices shown in the application, grinding wheel and blade engagement is effected during blade reciprocation and the aforesaid surfaces have generally uniform cross sectional contours viewed longitudinally. Thus, the longitudinally extending edge is effectively sharpened throughout its length.

Despite the foregoing, the significant advantages of "on-line" sharpening are somewhat tempered by limitations imposed on blade design. Sharpening devices of the type mentioned have limited capabilities. While they may be highly effective in sharpening a blade having a single longitudinally extending cutting edge bounded by a pair of longitudinally extending surfaces, blade designs with more complex cutting edges fall beyond their ambit. Thus, complex cutting edges which may include a main longitudinal edge and small auxiliary edges displaced from the main edge bounding surfaces cannot be effectively sharpened. Such blades, on the other hand, may be most desirable from the standpoint of cutting efficiency.

It is the general object of the present invention to provide an improved sharpenable cutting blade of the type mentioned and which includes both main and auxiliary cutting edges in a configuration which exhibits a high degree of cutting efficiency, and which is yet readily sharpenable with a sharpening means limited in its capability to engagement with main edge bounding and defining surfaces.

A further object of the present invention resides in the provision of a cutting blade of the type mentioned wherein the auxiliary cutting edges are so arranged as to be sharpened simultaneously with the main cutting edge by engagement of a sharpening means with the aforesaid main edge defining surfaces.

A still further object resides in the provision of a blade of the type mentioned wherein the auxiliary cutting edges are so oriented as to provide balanced and multi-directional cutting action.

SUMMARY OF THE INVENTION

In fulfillment of the foregoing objects, the cutting blade of the present invention is provided with a main longitudinally extending cutting edge defined by and between a pair of acutely angularly related surfaces. The surfaces may be planar or slightly arcuate in cross sectional contour and are substantially uniform throughout their length viewed longitudinally. A plurality of auxiliary cutting edges are provided and each such edge is half-defined or at least partially defined by a main edge defining surface. The auxiliary cutting edges are further oriented for balanced and multi-directional cutting action and the resulting blade is highly efficient in cutting action. Sharpening of all cutting edges may be readily achieved merely by removing surface material from the main edge defining surfaces.

More specifically, the auxiliary cutting edges are provided by skew-cutting the blade along its main cutting edge to form through notches which open at and extend rearwardly from the main cutting edge. Each notch has laterally extending side walls in longitudinally opposing relationship and laterally opposite ends of the opposing walls intersect respectively and at acute angles with the two longitudinal edge defining surfaces. Thus, a generally laterally extending auxiliary cutting edge is provided at each end of each notch at a line of intersection between a notch side wall and a longitudinal edge defining surface. The two auxiliary edges thus provided by each notch face in opposite longitudinal directions. Further, longitudinally adjacent notches are skew-cut so as to have their center lines displaced angularly in opposite directions from intersecting normal planes. An alternating series of oppositely inclined skew-cut notches and auxiliary cutting edges results. Notches are cut for angular displacement of their center lines from intersecting normal planes at angles in excess of 45°, and preferably at substantially higher angles, to provide sharply acute included angles at the auxiliary cutting edges. Viewed in longitudinal series along each side of the main cutting edge, the auxiliary cutting edges alternate in cutting direction, i.e. adjacent edges face in opposite longitudinal directions. Further, the two edges of each notch face in opposite longitudinal directions for lateral balance across the main edge. Balanced and efficient multi-directional cutting action results.

BRIEF DESCRIPTION OF THE DRAWINGS

FIG. 1 is a somewhat schematic perspective view of an automatically controlled sheet material cutting apparatus employing the improved cutting blade of the present invention.

FIG. 2 is an enlarged fragmentary side view of the improved cutting blade.

FIG. 3 is an enlarged fragmentary opposite side view of the improved cutting blade.

FIG. 4 is an enlarged fragmentary front view of the improved cutting blade.

FIG. 5 is a further enlarged fragmentary side view of the blade showing two adjacent notches.

DESCRIPTION OF THE PREFERRED EMBODIMENT

FIG. 1 illustrates an automatically controlled sheet material cutting apparatus, indicated generally at 10, of the type shown and described in greater detail in U.S. Pat. No. 3,495,392 to Pearl dated Feb. 17, 1970 entitled Apparatus For Working on Sheet Material, and which includes a sharpening device as disclosed in the aforementioned U.S. Pat. No. 4,033,214. The cutting apparatus 10 is employed in cutting multi-ply layups L of sheet material such as woven and non-woven fabrics, paper, cardboard, leather, rubber and synthetics. The illustrated apparatus is of a numberially controlled type and the controller is illustrated at 12 and operatively connected with the apparatus by means of cable 14. The controller 12 receives data from a program tape 16 and converts the data into machine commands for guiding a reciprocating cutting blade 20 along a predetermined cutting path P defined by the tape 16. The cutting path may for example comprise the periphery of a pattern piece forming a part of a garment or a panel of upholstery.

The apparatus 10 also includes a table 22 having a penetrable bed 24 defining a support surface for the layup L during cutting. The bed 24 may be comprised of a Styrofoam material or preferably a bed of bristles which are easily penetrated by the reciprocating cutting blade 20 without damage to either during traverse of cutting path P. The bed may also employ a vacuum system such as illustrated and described in greater detail in the above referenced U.S. Pat. No. 3,495,492 for holding the layup firmly in position.

The cutting blade 20 is suspended above the support surface of the table 22 by means of an X-carriage 26 and a Y-carriage 28. The X-carriage 26 translates back and forth in the illustrated X-coordinate direction on a set of racks 30, 32 which are engaged by an X-drive motor 34 energized by command signals from the controller 12. The Y-carriage 28 is mounted on the X-carriage 26 for movement relative to the X-carriage in the Y-coordinate direction and is translated by the Y-drive motor 36 and a lead screw 38 connected between the motor and carriage. Like the drive motor 34, the drive motor 36 is also energized by command signals by the controller 12. Thus, coordinated movements of the carriages 26 and 28 can translate the cutting blade 20 along a cutting path such as P over any area of the table 22.

The cutting blade 20 is suspended in cantilever fashion from a platform 40 attached to the projecting end of the Y-carriage 28 for elevating the sharp leading cutting edge of the blade into and out of cutting engagement with the layup of sheet material on the table 22. The blade 20 is reciprocated by means of a drive motor 42 also supported on the platform 40 and reciprocation of the blade may occur in both its operative and cutting position in engagement with the layup L, and in a withdrawn or elevated condition above the layup. Small grinding wheels 42, 42 beneath the platform have an associated mechanism for sequentially engaging the wheels with the cutting blade during withdrawn reciprocation of the blade. The wheels engage opposite main edge bounding surfaces 44, 46 to sharpen main edge 48, FIGS. 2–5. The grinding wheels 42, 42 and their operating mechanism may in all respects be identical with corresponding wheels and mechanism in the aforementioned co-pending U.S. application.

Referring more particularly to FIGS. 2–5, blade 20, which may be otherwise conventional, is provided with a plurality of auxiliary cutting edges which cooperate with a main cutting edge 48 between the surfaces 44, 46. The main cutting edge 48 may be ground or otherwise formed and, as mentioned, extends longitudinally of the blade 20 and faces forwardly or in a cutting direction. The edge is linear as shown but may take other configurations.

Surfaces 44, 46 bounding and defining the cutting edge 48 at their intersection, extend longitudinally and have cross sectional contours which are substantially uniform throughout their length. The surfaces may be planar or slightly arcuate in cross sectional contour and, as shown, the surfaces 46, 48 are slightly concave in cross sectional contour. The surfaces may be ground or otherwise formed initially and may vary slightly in width as illustrated, lower portions being somewhat narrower than the upper portions. The acute angular relationship of the surfaces 44, 46 may vary with cutting requirements but in all cases sharpening of the main cutting edge is accomplished by engagement of a grinding wheel or other sharpening means with the surfaces and the removal of surface material therefrom. Such engagement may occur only along the front portions of the surfaces adjacent the cutting edge but engagement must occur over at least a limited distance rearwardly from the edge 48. This condition is taken advantage of in the location and orientation of the auxiliary cutting edges of the present invention.

In FIG. 5 two (2) adjacent auxiliary cutting edges 50, 50 are shown. It will be noted that each edge 50 is relatively short and extends generally laterally rearwardly from the main cutting edge 48 of the blade. The edges face respectively in opposite longitudinal directions so as to respectively provide cutting action on down and up strokes of the blade 20. Further, each edge 50 is half-defined by the longitudinal main edge defining surface 46 so as to be sharpened simultaneously with the main edge during engagement of a sharpening means with the surface 46.

Configuration of the auxiliary cutting edges 50, 50 may vary but preferably and as illustrated each edge has an arcuate configuration viewed from the side of the blade 20. Further, each edge 50 intersects with the main or longitudinal cutting edge 48 at an obtuse included angle. A perpendicular or acute edge intersection condition may result in undesirable tearing of fabric or other sheet material to be cut.

In FIGS. 2–4 it will be observed that eight (8) cutting edges 50, 50 are provided in a longitudinally extending series along each of the surfaces 44, 46. The edges alternate in cutting direction and each edge resides in or is half-defined by its associated main edge defining surface.

The manner in which the auxiliary edges 50, 50 are provided may also vary widely within the scope of the invention. As shown, the edges are provided by skew cutting through notches in the main or longitudinal cutting edge of the blade. The notches may be ground or otherwise machined in the blade and may vary in cross sectional configuration. Notches 52, 52 shown are generally U-shaped in cross sectional configuration to provide the arcuate shape desired for the auxiliary cutting edges 50, 50. Further, their cross sectional configuration is uniform throughout its length to provide each notch with longitudinally opposed laterally extending side walls. In FIG. 5 the upper notch 52 has a lower laterally extending side wall 54 and an opposed upper laterally extending side wall 56. Similarly the lower notch 52 has lower and upper lateral side walls 54, 56. As will be apparent, the auxiliary cutting edges 50, 50 are defined by lines of intersection between the lateral side walls of the notches 52, 52 and the surfaces 44, 46. Each notch side wall half-defines a cutting edge 50 at one end and at an opposite end its line of intersection with a surface 44, 46 is at an obtuse angle to provide a blunt non-cutting edge. Such edges are illustrated at 58, 58 in FIG. 5. Entrance clearance for fabric or other sheet material is thus provided to the auxiliary cutting edges.

Referring now to FIGS. 2-4, it will be observed that the uppermost notch 52 provides an auxiliary cutting edge 50 at its upper lateral wall in cooperation with the longitudinal edge defining surface 46. At its lower lateral wall, the uppermost notch 52 provides a cutting edge 50 at its intersection with the opposite surface 44. Thus, each notch 52 provides two auxiliary cutting edges 50, 50 respectively on opposite sides of the main cutting edge of the blade 20. Eight (8) notches 52, 52 are provided to form the sixteen (16) cutting edges 50, 50 mentioned above.

For balanced operation and effective cutting action it is the presently preferred practice to alternate the direction of notch cuts along the main edge of the cutting blade 48. That is, each notch is skew cut with its center line displaced angularly from a plane normal to the longitudinal axis of the blade but adjacent notches have their center lines oppositely displaced. In FIG. 4, a center line 60 for the uppermost notch 52 is inclined upwardly and leftwardly while a subadjacent notch 52 has its center line 62 inclined upwardly and rightwardly. Proceeding downwardly, the center lines of notches 52, 52 are similarly alternated in their orientation.

The angle of inclination of the notch center lines with respect to planes normal to the longitudinal axis of the blade should be in excess of forty five degrees (45°) and the notches shown are inclined at angles in excess of sixty degrees (60°). Sharp effective auxiliary edges 50, 50 result and the sharpening operation on the edges is facilitated.

From the foregoing it will be apparent that there may be substantial variation in the configuration, location and orientation of auxiliary cutting edges within the scope of the invention. Special cutting requirements can be fulfilled with sophisticated cutting edge configurations and yet required sharpening operations can be held within the limits of "on-line" sharpening means designed for cutting blades having simple edge configurations with only a single main cutting edge.

I claim:
1. In sheet material cutting apparatus including an elongated cutting blade adapted to be translated along its longitudinal axis in cutting action and havng a forwardly facing longitudinally extending main cutting edge defined by and between a pair of acutely angularly related and intersecting surfaces, means for effecting longitudinal translation and lateral advancement of the cutting blade through sheet material in cutting engagement therewith and along a predetermined cutting path, blade sharpening means engageable with each of said longitudinal edge defining surfaces on the blade, and means for effecting relative longitudinal movement between the blade and sharpening means for sharpening said longitudinal main cutting edge, the improvement comprising at least two short auxiliary cutting edges on said blade each extending generally laterally rearwardly from said longitudinal main edge and each being half-defined by a main edge defining surface so as to be sharpened simultaneously with said main edge during engagement and relative movement between said sharpening means and said surface.

2. The improvement in sheet material cutting apparatus as set forth in claim 1 wherein said two auxiliary cutting edges respectively face in opposite longitudinal directions.

3. The improvement in sheet material cutting apparatus as set forth in claim 1 wherein said pair of longitudinal edge defining surfaces respectively half-define said two auxiliary cutting edges, the auxiliary edges being disposed on opposite sides of the main edge.

4. The improvement in sheet material cutting apparatus as set forth in claim 3 wherein said blade is provided with a laterally extending through notch which opens forwardly at and extends rearwardly from its said longitudinal main cutting edge, longitudinally opposite laterally extending side walls of said notch intersecting respectively at acute angles with said main edge defining surfaces, and said two auxiliary cutting edges being thus defined respectively at the lines of intersection between said notch side walls and said main edge defining surfaces.

5. The improvement in sheet material cutting apparatus as set forth in claim 4 wherein said notch has a uniform cross sectional configuration throughout its length and a laterally extending center line displaced angularly from a plane normal to the longitudinal axis of the blade.

6. The improvement in sheet material cutting apparatus as set forth in claim 5 wherein said notch has a generally U-shaped cross sectional configuration whereby to provide said auxiliary cutting edges with a gradual arcuate shape.

7. The improvement in sheet material cutting apparatus as set forth in claim 5 wherein said notch center line is displaced angularly from said normal plane through an angle in excess of forty-five degrees (45°).

8. The improvement in sheet material cutting apparatus as set forth in claim 4 wherein each of said two auxiliary cutting edges meets said longitudinal main cutting edge at an obtuse included angle.

9. The improvement in sheet material cutting apparatus as set forth in claim 5 wherein said blade is provided with a plurality of similar notches each cooperating with said main edge defining surfaces to provide two auxiliary cutting edges respectively on opposite sides of said main edge and facing in opposite longitudinal directions.

10. The improvement in sheet material cutting apparatus as set forth in claim 9 wherein longitudinally adjacent notches have their center lines displaced angularly from a normal plane in opposite directions.

11. The improvement in sheet material cutting apparatus as set forth in claim 10 wherein the displacement of each notch center line from an intersecting normal plane is in excess of forty five degrees (45°).

12. An elongated sharpenable cutting blade for use in sheet material cutting apparatus including a sharpening means adapted to engage and remove surface material from the acutely angularly related surfaces; said blade including a pair of acutely angularly related intersecting surfaces adapted for engagement by said sharpening means and defining therebetween a forwardly facing and longitudinally extending main cutting edge, and at least two short auxiliary cutting edges on said blade each extending generally laterally rearwardly from said longitudinal main edge and respectively facing in opposite longitudinal directions, and each of said auxiliary edges being half-defined by a main edge defining surface so as to be sharpened simultaneously with said main edge during engagement of said sharpening means with said surface.

13. An elongated sharpenable cutting blade as set forth in claim 12 wherein said blade is provided with a laterally extending through notch which opens forwardly at and extends rearwardly from its said longitudinal main cutting edge, longitudinally opposite laterally extending side walls of said notch intersecting respectively at acute angles with said main edge defining surfaces, and said two auxiliary cutting edges being thus defined respectively at the lines of intersection between said notch side walls and said main edge defining surfaces.

14. An elongated sharpenable cutting blade as set forth in claim 13 wherein said notch has a uniform cross sectional configuration throughout its length and a laterally extending center line displaced angularly from a plane normal to the longitudinal axis of the blade.

15. An elongated sharpenable cutting blade as set forth in claim 14 wherein said blade is provided with a plurality of similar notches each cooperating with said main edge defining surfaces to provide two auxiliary cutting edges respectively on opposite sides of said main edge and facing in opposite longitudinal directions.

16. An elongated sharpenable cutting blade as set forth in claim 15 wherein longitudinally adjacent notches have their center lines displaced angularly from intersecting normal planes in opposite directions.

17. An elongated sharpenable cutting blade as set forth in claim 16 wherein the displacement of each notch center line from an intersecting normal plane is in excess of forty five degrees (45°).

18. An elongated sharpenable cutting blade including a pair of acutely angularly related intersecting surfaces defining therebetween a forwardly facing and longitudinally extending main cutting edge, said blade also having a plurality of skew-cut laterally extending through notches each of which opens forwardly at and extends rearwardly from its said longitudinal main cutting edge, laterally opposite ends of longitudinally opposite laterally extending side walls of said notches intersecting respectively at acute angles with said main edge defining surfaces, a generally laterally extending auxiliary cutting edge being thus defined at each end of each notch at a line of intersection between a notch side wall and a main edge defining surface, and the two auxiliary edges thus provided by each notch facing in opposite longitudinal directions.

19. An elongated sharpenable cutting blade as set forth in claim 18 wherein longitudinally adjacent notches are skew-cut so as to have their center lines displaced angularly in opposite directions from intersecting normal planes.

20. An elongated sharpenable cutting blade as set forth in claim 19 wherein the angular displacement of each notch center line from an intersecting normal plane is in excess of sixty degrees (60°).

* * * * *